Dec. 12, 1961  W. C. GUNGLE ET AL  3,013,169
HIGH OUTPUT FLUORESCENT LAMP
Filed June 27, 1956
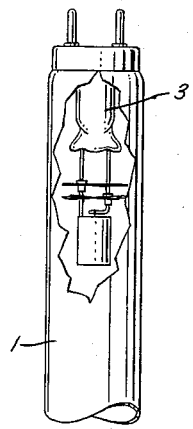
FIG. I
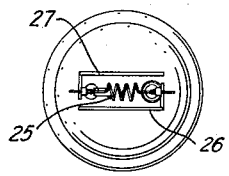
FIG. 5
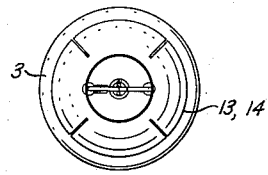
FIG. 3
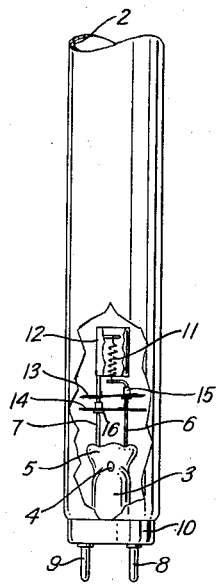
FIG. 4
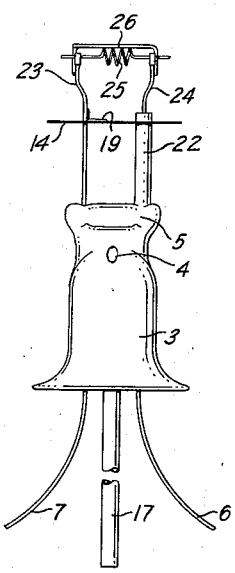
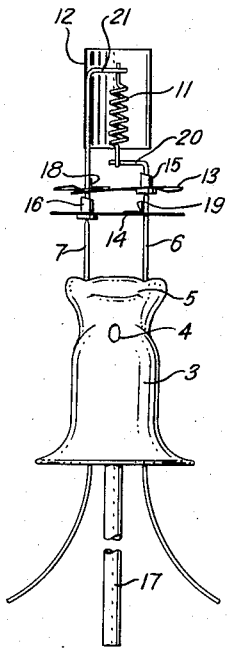
FIG. 2
INVENTORS:
WARREN CALVIN GUNGLE
JOHN F. WAYMOUTH
BY    FRANCIS BITTER
*Lawrence Burns,*
ATTORNEY

United States Patent Office 3,013,169
Patented Dec. 12, 1961

3,013,169
HIGH OUTPUT FLUORESCENT LAMP
Warren Calvin Gungle, Salem, John F. Waymouth, Marblehead, and Francis Bitter, Cambridge, Mass., assignors, by mesne assignments, to Sylvania Electric Products Inc., Wilmington, Del., a corporation of Delaware
Filed June 27, 1956, Ser. No. 594,241
13 Claims. (Cl. 313—42)

This invention relates to low-pressure fluorescent electric discharge lamps, and to apparatus and methods for operating such lamps at high outputs with high efficiency.

Low pressure fluorescent lamps of high efficiency have been previously known, but the efficiency was obtained by operating the lamp at low current density and with the lamp operating at low temperature, such as about 40° C. The most popular lamp of that type was the well-known 40-watt lamp, in a tube 1½ inches in diameter and 48 inches long. Attempts to operate that lamp at 200 watts for example, reduced the efficiency to 34% of its optimum value, when the lamp was allowed to operate under the same ambient conditions. Under such conditions, the lamp wall temperature rose to 95° C.

If the lamp wall temperature were kept low, for example at about 45° C., by cooling the lamp, the efficiency at 200 watts would rise, but would still be only 47% of optimum, according to Forsythe and Adams in their book "Fluorescent and Other Electric Discharge Lamps" (Murray Hill Press, New York City, 1948, pp. 84–85). Forsythe and Adams conclude that "These data show that even for constant mercury pressure (constant wall temperature) in the tube, the extra current through the tube causes a marked drop in the efficiency of production of the 2537-A. radiation." The 2537 angstrom radiation is, of course, the main excitation for the light-emitting phosphor in the fluorescent lamp.

Another long-time worker in the field of low pressure mercury lamps, L. J. Buttolph, in a recent article in Illuminating Engineering, the official journal of the Illuminating Engineering Society (p. 326, vol. 49, July 1954) states in speaking of low-pressure fluorescent lamps, that "Efficiency and very high output intensity are incompatible in such lamps."

It is clear, then, that the art regarded very high output and high efficiency as incompatible in low pressure fluorescent lamps. In fact, although fluorescent lamps have now been used commercially for at least 18 years, no such very high output lamps have previously been placed on the market. No 200-watt lamp, for example, has previously been marketed in the 48 inch long, 1½ inch diameter tube of the usual 40-watt lamp, nor even in a tube twice that long.

Accordingly, an object of the present invention is to produce a fluorescent lamp of very high output and high efficiency. This object is attained by operating a small portion of the lamp at low temperature and by using a gas filling other than the customary argon or krypton. The results are completely unexpected, because with our invention a 200-watt lamp in a 40-watt bulb can give an efficiency 80% as great as the optimum efficiency with 40 watts. Such an efficiency is far greater than the 47% obtained by Forsythe and Adams, for the same input to the same size lamp.

We have discovered, moreover, that our high efficiency can be obtained with the main bulb wall temperature very hot, even at the 95° C. for which Forsythe and Adams obtained only 34% of optimum efficiency, provided that one very small region of the bulb is kept cool. The area of the cool region can be less than 1% of the area of the bulb, a cool spot only about ⅛ of an inch in diameter being sufficient. The entire light-emitting portion of the bulb can run at high temperature, except for a small cooler area at the end of the bulb.

We find also that because of the small area of cooling required, the bulb does not have to have water-cooling, nor forced air-cooling, but can be cooled by shielding at least one end of the lamp from the radiation from the discharge. A heat shield can be used between an end of the lamp and the cathode at that end. The advantage of using neon or helium gas at low pressure can also be obtained with such a method of cooling, and with other methods.

The shield should be spaced from the end of the lamp, and should have a diameter smaller than that of the inner diameter of the lamp tube, in order to permit the vapor to circulate throughout the lamp. Where the bulb has a stem press, the diameter of the shield should be greater than the length of the stem press, transverse to the longitudinal axis of the lamp to insure that the condensation of mercury will occur at a point other than between the lead-in wires, which could be short-circuited by it.

In the case of lamps operated at extremely high outputs, such as 200 watts in a 48-inch long 1½ inch diameter bulb of the so-called 40-watt type, two such shields spaced somewhat from each other can be used to get the desired cool spot at the end of the bulb.

The shields should be of a reflective material such as metal. Non-reflective shields will absorb the energy reaching them, instead of reflecting it, and will thereby reach a high temperature themselves and heat up the end of the lamp.

We have also discovered that the full high efficiency at high output cannot be obtained with a filling of the customary argon, or argon-krypton mixtures, but that neon or helium gas should be used. The pressure should be low, for example a pressure of about 1 mm. of mercury, if the lamp is to come to equilibrium quickly, particularly at first starting.

The effect of neon and helium in increasing the efficiency of low-pressure fluorescent lamps was not previously known, and in fact the use of neon in the ordinary, low-output, fluorescent lamp was known to give a reduction in efficiency over that obtained from the use of argon in such lamps as shown by Meister and Heine (Illuminating Engineering, vol. XLVII, No. 7, March 1952, p. 162, FIG. 6).

In fact, the use of krypton was recommended by the earlier workers in the art, because krypton is one of the heaviest of the rare gases, and the heavier mass of the krypton atom gives a smaller average energy loss by electrons in collision with the atoms of the filling gas during the discharge. Moreover, the cross-section for elastic scattering by the neon and helium atoms is greater than for krypton or argon, resulting in a larger number of collisions per unit length and an increased total loss for that reason also.

The table below gives the atomic mass numbers and the number of collisions per unit length (with 1 ev. electrons) for the various rare gases, together with the ratio of the latter to the former.

| Gas | Atomic Mass Number A. | Collisions per unit length Pc | Ratio Pc/A. |
|---|---|---|---|
| He | 4 | 17 | 4.25 |
| Ne | 20 | 5 | 0.250 |
| A | 40 | 3 | 0.075 |
| Kr | 83 | 4 | 0.048 |
| Xe | 130 | 7 | 0.054 |

Previous workers in the art, based on considerations of Pc/A. as given in the above table, concluded that argon, krypton and xenon, especially the latter two, would give the lowest electron-scattering losses, and hence the highest efficiency.

The conclusions of the previous workers were in fact confirmed for low power inputs. However, we now find quite unexpectedly that at high power inputs neon and helium, previously considered to be the poorest gases of all to use, are actually the most effective and efficient. They actually reduce the rapid drop in efficiency which occurs with the other rare gases when the power input is increased.

The remarkable difference between the use of the customary argon fill and the neon fill of our invention, in lamps with shields such as described, is clear from the following comparison of two 8 foot long, 1½ inch diameter tubular glass fluorescent lamps, with a single internal reflective shield at each end of the lamp, between the end of the lamp and the cathode, the lamps being identical except for the gas used. The effect of applying 200 watts input to a so-called "80-watt" prior commercial lamp of the same geometrical size is also shown. The prior lamp has argon at a pressure of about 2 mm. of mercury, and a filling of mercury but no shield.

One lamp contained neon at 1 mm. of mercury pressure, the other contained argon at the same pressure.

| Gas Filling | Volts | Amperes | Watts | Lumens Output |
|---|---|---|---|---|
| Neon | 180 | 1.3 | 200 | 14,400 |
| Argon | 102 | 2.2 | 200 | 9,500 |
| Prior Lamp | 103 | 2.1 | 200 | 8,000 |

The lamps in the above tabulation were all operated for two hours for stabilization before the data was taken.

We have discovered that the desired high efficiency at high input can be obtained without the need for any enlargements or protuberances in the glass tube itself, and that the tube can consequently be of substantially uniform diameter from end to end. The tube will therefore be free-rolling and suitable for mass production machinery.

Other objects, features and advantages of the invention will be apparent from the following specification, taken in connection with the accompanying drawing, in which:

FIGURE 1 is a view of a lamp according to one embodiment of the invention;

FIGURE 2 is a view showing the mount structure of said embodiment in greater detail;

FIGURE 3 is a top view of the mount structure of FIGURE 3;

FIGURE 4 is a view of another mount structure according to an embodiment of the invention; and FIGURE 5 is a top view of the mount structure of FIGURE 4.

In the lamp of FIG. 1, a glass tube 1 has a coating 2 of phosphor on its inside surface, and is hermetically sealed at each end to a stem 3. The latter has an opening 4 leading to the usual exhaust tube (not shown in FIG. 1) through which the lamp is exhausted during manufacture, but which is sealed in the completed lamp.

The lead-in wires 6, 7, sealed through the press 5 of stem 2, extend outside the lamp to make contact with the contact pins 8, 9 extending from the base 10, which is cemented to the end of tube 1. The base 10 can be of the usual metal type, with an insulated portion (not shown) carrying the pins 8, 9.

Inside the tube the lead-in wires support the filamentary electrode 11, which can be a coiled tungsten wire, preferably of the coiled-coil or triple coil well-known in the art, and carrying a quantity of electron-emitting substances such as the usual alkaline earth oxides, preferably with the addition of a small quantity of zirconium dioxide. The coil and its coating may be, for example, as shown in U.S. Patent No. 2,530,394, issued November 21, 1950, to E. F. Lowry et al., or may be of any other suitable type.

In FIGURES 1 and 2, the filamentary coil 11 is preferably placed with its axis substantially along the axis of the tube 1, and is held by the lead-in wires 6, 7, each being bent toward the axis in order to hold the filament in preferable position. The axial position reduces the amount of heat radiation from the filament toward the end of the lamp.

The heavy current of the very-high-output lamp may cause some disintegration of the filamentary coil or of its coating, and so the cylindrical metal shield 12 is placed around the coil, but spaced therefrom, and connected to lead-in wire 7. The shield 12 reduces the current to the coil during the half-cycle when the filament coil 12 is the anode, and also collects any particles disintegrated from the cathode. The shield is preferably blackened, for example with a carbon coating, to radiate heat effectively and keep its temperature low.

The reflecting shields 13, 14 can be of aluminum, for example, and are supported from the lead-in wires 6, 7. Each shield should be insulated from at least one of the lead-in wires, to prevent short-circuiting them. The shield 13, for example, can be metallically connected to lead-in wire 7 by being welded thereto, and can be insulated from lead-in wire 6 by the insulating ceramic bushing 15. Similarly, shield 14 can be insulated from lead-in wire 6 by the insulating ceramic bushing 16 and metallically connected to lead-in wire 7. Both shields may be electrically connected to the same lead-in wire if desired, and both insulated from the other lead-in wire, although we prefer to have them oppositely connected as described. Nickel and other reflecting metals can also be used for the shields.

As shown in FIGURE 3, the shields 13, 14 can be discs, having openings through which the lead-in wires 6, 7 extend. The discs preferably have a few radial slots to aid in the process of "bombarding" the shields during processing to remove impurities therefrom, the bombardment comprising the inducing of high frequency currents in the shields 6, 7 by placing around the tube 1 a coil carrying high frequency currents.

The shield construction is shown in greater detail in FIG. 2, which also shows the exhaust tube 17 extending from the exhaust opening 4. The L-shaped tabs 18, 19, are welded to the lead-in wires 6, 7, respectively, tube 19 being also welded to shield 14 and tab 18 being welded to shield 15, to support them.

It is generally desirable to put the radial slots 27, 28 in the top shield 13, to equalize the heating between the two shields, 13, 14, and the cylindrical shield 12, if they are heated by high frequency induction to remove absorbed gases during processing.

In FIGURES 4 and 5, a different mount structure is shown. The stem 3, press 5, exhaust tube 17, and lead-in wires 6 and 7 are the same as in FIGURES 2 and 3. Only a single reflecting shield 14 is used, however, and while connected to lead-in wire 7 by a tab 19 as before, is insulated from lead-in wire 6 by a glass tube 22.

The lead-in wires 6, 7 are bent outwardly at 23, 24 and their ends are clamped over the ends of a filamentary electrode 25, which can be of the type now in commercial use in 100-watt, 4 foot, 1½ inch diameter fluorescent lamps. One of a pair of auxiliary electrodes 26, 27, each comprising a wire which for most of its length is parallel to and slightly above the filamentary electrode 25, is welded to each of the lead in wires 6, 7 to collect some of the current when the electrode acts as anode, during alternate half-cycles of the alternating current generally used through the discharge.

This type of cathode is especially useful in a lamp having a power loading of about 25 watts per linear foot, for example. The filament can be in the transverse position shown.

The position of the filament 11, 25 and of the shields 13, 14 is quite important. The farther from the end of the lamp that the electrode is placed, the cooler the end of the lamp will be, but the shorter will be the illuminated portion of the lamp tube. The main discharge only fills the part of the lamp tube between the electrode.

We have found that in a lamp with electrodes such as shown in FIGURES 2 and 3, with 200 watts input to a lamp 4 foot long in outside dimension, and about 1½ inches in diameter, the shield can be placed about 10 mm. from the bottom of the cylindrical shield 12 and about 10 mm. from the top of stem press 5. Since the top of stem press 5 is about 40 mm. from the end of the tube, the shield 14 will be about 50 mm. from said end. The shield 13 is about 5 mm. in front of shield 14.

The temperature of the end of the tube, where the mercury condenses, will be as follows, for 200 watts input to a 4-foot long, 1½ inch diameter tube, for different distances of the shield 14 from the end of the tube.

| Distance: | Temperature, °C. |
|---|---|
| 46 mm | 42 |
| 50 mm | 39 |
| 64 mm | 37 |

The 50 mm. distance is accordingly the best, since it will lower the temperature to about 40° C., with the lamp run as above (in still air at 80° F.).

With 200 watts in an 8-foot lamp of the same diameter, with a single shield 14 and cathode as in FIGS. 4 and 5, the best distance of the shield 14 from the end of the lamp is about 54 mm., that is 14 mm. above the top of the stem press 5, with the electrode 25 placed about 10 mm. above the shield 14. The distance of said shield from the end of the lamp can vary from about 45 mm. to about 60 mm. with good results, but for highest efficiency should be between about 49 to 55 mm. This will give a preferred temperature range of from about 35 to 50° C.

Similarly, the shields in the embodiment of FIGURES 2 and 3 should be set for the same temperature range.

The lamps can be filled with neon at 1 mm. of mercury pressure, although other pressure can be used. To facilitate starting of the lamp, a small amount of argon, for example 0.1% by volume, can be added to the neon gas. The amount is preferably between 0.04% and 0.2%.

The lamps of our invention may require an hour or more of operation, when lighted for the first time, in order to become "stabilized" that is, in order for the mercury to be vaporized from other parts of the tube, into the cool end.

The word "light" as applied to the shields herein and in the appended claims, is intended to include all forms of radiation within its scope, including the infra-red and ultra-violet.

The particular embodiments herein described have been given by way of example and not by way of limitation, and various modifications will be apparent to a person skilled in the art, without departing from the spirit and scope of the invention.

What we claim is:

1. A fluorescent lamp comprising an elongated tubular envelope, a lamp stem at each end of said envelope to seal off the same, said stem terminating inside the envelope in a stem press, lead-in wires sealed through said stem press, a filamentary electrode supported within the envelope electrically connected between said lead-in wires and spaced from said stem press, and a radiation-reflecting shield supported within the envelope between said electrode and said stem press, said shield extending beyond the stem press in a direction generally transverse to the longitudinal axis of said tube but being spaced from the internal surface of said envelope, to cool a region near the end of said envelope to a temperature of between about 35 and about 45° C. in an ambient temperature of 80° F. in still air.

2. The lamp of claim 1, in which the shield is placed about 50 millimeters from the end of the tubular envelope.

3. A fluorescent lamp comprising an elongated sealed tubular mercury-containing envelope, a coating of phosphor on the interior surface thereof, an electrode supported within the envelope near each end of said envelope but spaced from said end, and a radiation-reflecting shield supported within the envelope between each said electrode and the end of the envelope nearest said electrode, to maintain the mercury vapor pressure in the range of 4 to 15 microns for an ambient temperature of about 20° C. in still air.

4. The lamp of claim 3, in which the shield is placed about 50 millimeters from the end of the tubular envelope.

5. The lamp of claim 3, in which the electrode is a coiled metal filament having its longitudinal axis substantially along the longitudinal axis of the tubular envelope, whereby the heat radiation from the filament toward the end of the lamp is reduced.

6. The lamp of claim 3, in which there is a second radiation-reflecting shield between the shield mentioned in claim 3 and the same end of the envelope.

7. A fluorescent lamp comprising: an elongated tubular envelope; a coating of phosphor on the interior surface thereof; a filling of inert gas therein; a quantity of mercury therein; a lamp stem at each end of said envelope to seal off the same, said stem terminating inside the envelope in a stem press, lead-in wires sealed through said stem press, a filamentary electrode supported within the envelope electrically connected between said lead-in wires and spaced from said stem press; and a radiation-reflecting shield supported within the envelope between said electrode and said stem press, said shield extending beyond the stem press in a generally transverse direction to the longitudinal axis of said tube but being spaced from the internal surface of said envelope, in order to cool a region near the end of said envelope to a temperature of between about 4 and about 15 microns while permitting diffusion of vapor from the mercury in the tube through the space between said shield and the internal surface of said envelope.

8. A fluorescent lamp comprising an elongated single-walled sealed tubular mercury containing envelope, a coating of phosphor on the interior surface thereof, an electrode supported within the envelope near an end of said envelope but spaced from said end, and a radiation-reflecting shield supported within the envelope between said electrode and said end to maintain the mercury vapor pressure in the range of 4 to 15 microns for an ambient temperature of about 20° C. in still air, said shield being solid and substantially free from holes, and a filling of an inert gas at low pressure therein, said gas being selected from the group consisting of neon and helium.

9. A fluorescent lamp comprising: an elongated tubular envelope; a lamp stem at each end of said envelope to seal off the same, said stem terminating inside of the envelope in a stem press, lead-in wires sealed through said stem press, a filamentary electrode supported within the envelope electrically connected between said lead-in wires and spaced from said stem press, and a radiation-reflecting shield supported within the envelope between said electrode and said stem press, said shield extending beyond the stem press in a generally transverse direction to the longitudinal axis of said tube but being spaced from the internal surface of said envelope in order to cool a region near the end of said envelope to a temperature of between about 4 and about 15 microns, and a filling of an inert gas at low pressure therein, said gas being selected from the group consisting of neon and helium.

10. A fluorescent lamp comprising: an elongated tubular envelope; a lamp stem at each end of said envelope to seal off the same, said stem terminating inside the envelope in a stem press, lead-in wires sealed through said stem press, a filamentary electrode supported within the envelope electrically connected between said lead-in wires and spaced from said stem press, and a radiation-reflecting shield supported within the envelope between said electrode and said stem press, said shield extending beyond the stem press in a generally transverse direction to the longitudinal axis of said tube but being spaced from the internal surface of said envelope in order to cool a region near the end of said envelope to a temperature of between about 4 and about 15 microns, and a filling of an inert gas at low pressure therein.

11. An electric discharge lamp comprising an elongated sealed tubular mercury-containing envelope, an electrode supported within the envelope near an end of said envelope but spaced from said end, and a radiation-reflecting shield supported within the envelope between said electrode and said end to provide a cool region for condensation of mercury to maintain the mercury vapor pressure low.

12. An electric discharge lamp comprising an elongated sealed tubular mercury-containing envelope, an electrode supported within the envelope near an end of said envelope but spaced from said end, and a radiation-reflecting shield supported within the envelope between said electrode and said end to maintain the mercury vapor pressure in the range of 4 to 15 microns for an ambient temperature of about 80° F. in still air.

13. An electric discharge lamp comprising an elongated tubular envelope, a lamp stem at each end of said envelope to seal off the same, said stem terminating inside the enevelope in a stem press, lead-in wires sealed through said stem press, a filamentary electrode supported within the envelope electrically connected between said lead-in wires and spaced from said stem press, and a radiation-reflecting shield supported within the envelope between said electrode and said stem press, said shield extending beyond the stem press in a direction generally transverse to the longitudinal axis of said tube but being spaced from the internal surface of said envelope, to cool a region near the end of said envelope to a temperature of between about 35 and about 45° C. in an ambient temperature of 80° F. in still air.

References Cited in the file of this patent

UNITED STATES PATENTS

| | | |
|---|---|---|
| 2,051,623 | Tonks | Aug. 18, 1936 |
| 2,087,735 | Pirani et al. | July 20, 1937 |
| 2,433,404 | Smith | Dec. 30, 1947 |
| 2,549,355 | Winninghoff | Apr. 17, 1951 |
| 2,777,082 | May | Jan. 8, 1957 |
| 2,802,129 | Meister et al. | Aug. 6, 1957 |
| 2,826,710 | Lipscomb | Mar. 11, 1958 |

FOREIGN PATENTS

| | | |
|---|---|---|
| 114,735 | Sweden | Aug. 28, 1945 |